(12) United States Patent
Berniolles et al.

(10) Patent No.: US 12,371,041 B2
(45) Date of Patent: Jul. 29, 2025

(54) LEAN-COMPENSATED POSITION AND TRAJECTORY OF MOTORCYCLE

(71) Applicant: Damon Motors Inc., Vancouver (CA)

(72) Inventors: Nicolas Berniolles, Richmond (CA); Li Chen, Coquitlam (CA); Cole William Harkness, Richmond (CA)

(73) Assignee: Damon Motors Inc., Vancouver (CA)

(*) Notice: Subject to any disclaimer, the term of this patent is extended or adjusted under 35 U.S.C. 154(b) by 106 days.

(21) Appl. No.: 17/688,862

(22) Filed: Mar. 7, 2022

(65) Prior Publication Data
US 2023/0278573 A1 Sep. 7, 2023

(51) Int. Cl.
| | |
|---|---|
| *B60W 50/00* | (2006.01) |
| *B60W 30/12* | (2020.01) |
| *B60W 40/105* | (2012.01) |
| *B60W 50/14* | (2020.01) |
| *B62J 27/00* | (2020.01) |
| *B62J 45/415* | (2020.01) |

(52) U.S. Cl.
CPC ............ *B60W 50/14* (2013.01); *B60W 30/12* (2013.01); *B60W 40/105* (2013.01); *B62J 27/00* (2013.01); *B62J 45/4151* (2020.02); *B60W 2050/146* (2013.01); *B60W 2300/36* (2013.01); *B60W 2554/4041* (2020.02); *B60W 2554/4049* (2020.02)

(58) Field of Classification Search
CPC .. B60W 50/14; B60W 30/12; B60W 30/0956; B60W 40/105; B60W 2050/146; B60W 2050/143; B60W 2300/36; B60W 2554/4041; B60W 2554/4049; B62J 27/00; B62J 45/4151; B62J 50/21; G08G 1/096716; G08G 1/096775; G08G 1/165; G08G 1/166; G08G 1/167
See application file for complete search history.

(56) References Cited

U.S. PATENT DOCUMENTS

| | | | | |
|---|---|---|---|---|
| 9,153,133 | B1* | 10/2015 | Lunsford | G08G 1/166 |
| 10,029,683 | B1* | 7/2018 | Ginther | B60W 50/16 |
| 10,429,501 | B2* | 10/2019 | Pineda-Deom | G06V 10/147 |
| 11,148,592 | B2* | 10/2021 | Aizawa | B62J 50/22 |
| 11,462,021 | B2* | 10/2022 | Oesterling | B60R 1/24 |
| 11,798,290 | B2* | 10/2023 | Oesterling | G08G 1/166 |
| 2009/0222164 | A1* | 9/2009 | Seiniger | B62J 45/4151 702/141 |
| 2013/0141576 | A1* | 6/2013 | Lord | G08G 1/162 348/148 |
| 2013/0311075 | A1* | 11/2013 | Tran | B60Q 1/535 701/117 |
| 2015/0130943 | A1* | 5/2015 | Wahl | G06V 20/588 348/148 |

(Continued)

*Primary Examiner* — Phutthiwat Wongwian
*Assistant Examiner* — Sherman D Manley
(74) *Attorney, Agent, or Firm* — Damien G. Loveland; Valuetech Patent Agency Inc.

(57) ABSTRACT

Motorcycle riders, being more vulnerable than drivers of four-wheeled vehicles, can especially benefit from advance warnings of hazards. Hazards are detected in the predicted path of the motorcycle or are predicted to be in the path within the next few seconds of the motorcycle's travel. The outputs from the sensors that detect the hazards are corrected for the lean of the motorcycle as it corners. The predicted path or ego lane of the motorcycle is also adjusted depending on the lean of the motorcycle.

18 Claims, 7 Drawing Sheets

(56) References Cited

U.S. PATENT DOCUMENTS

| | | | |
|---|---|---|---|
| 2017/0176591 A1* | 6/2017 | Pineda-Deom | G01S 13/931 |
| 2020/0269868 A1* | 8/2020 | Giraud | B62J 25/06 |
| 2020/0398750 A1* | 12/2020 | Aizawa | B62J 50/22 |
| 2021/0221368 A1* | 7/2021 | Lavi | B60Q 1/525 |
| 2022/0222475 A1* | 7/2022 | Oesterling | G08G 1/166 |
| 2023/0159126 A1* | 5/2023 | Berniolles | B60W 50/14 |
| | | | 340/435 |
| 2023/0365130 A1* | 11/2023 | Chen | B60W 30/0956 |

\* cited by examiner

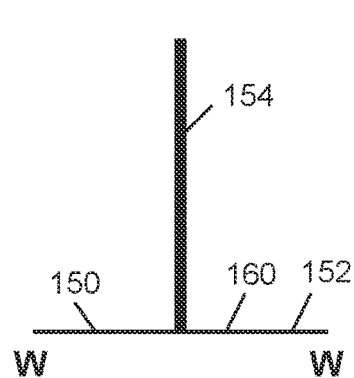
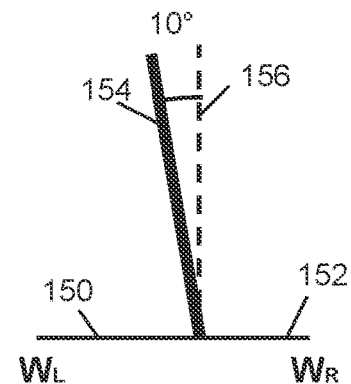
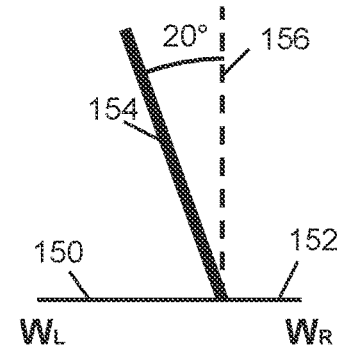
FIG. 10　　　　　FIG. 11　　　　　FIG. 12
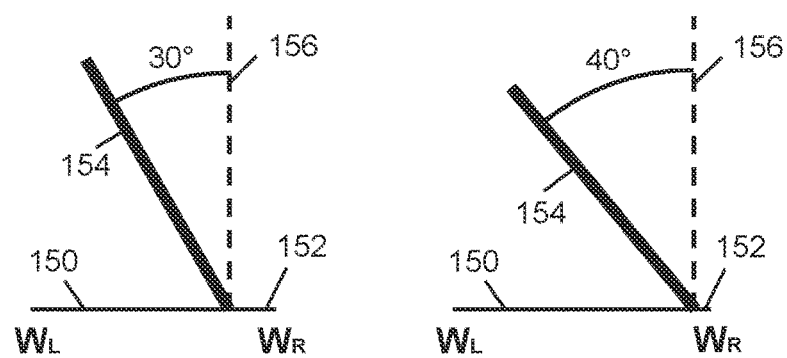
FIG. 13　　　　　FIG. 14

LEAN-COMPENSATED POSITION AND TRAJECTORY OF MOTORCYCLE

TECHNICAL FIELD

This application relates to vehicle position determination. In particular, it relates to lateral road positioning and trajectory determination for a motorcycle.

BACKGROUND

Motorcycles by design pose an inherent risk to their riders due to their two-wheel configuration and open structure, which leave the rider vulnerable to the road and other traffic. While it is this same freedom, mobility, and often the affordability of consumer-friendly models which increasingly draw riders around the world to the craft of motorcycling, these elevated numbers of motorcyclists face a statistically high likelihood of accidental injury and death. A motorcycle's narrow profile in a car lane also proves more a visibility disadvantage than a spatial buffer compared to cars. Cars and other vehicles not only pose their own threat but also tend to hide motorcycles from being visible to other traffic. Existing vehicle positioning systems can only determine if a vehicle is between lane markings if the markings are present, clear and unobstructed on the road.

Removable smart devices can be incorporated into motorcycle engineering to expand the operational controls and instruments, or to replace the inbuilt dashboard liquid crystal screen entirely to provide rear camera views, as in patent application US20210245601 by Giraud et al. which describes a docking system. The docked smart device can link to the motorcycle wirelessly or wired, operate the ignition using encrypted communication, function hands free, use facial recognition and tactile identity authentication, pair with anything a smart device is able to such as phones, radio, or internet, and can simplify the vehicle's own software update process. It may be used in a system to receive and analyze sensor information, determine a course of action regarding a hazard, and initiate an alert by way of the screen or speaker on the smart device.

The critical use of smart devices for the enhancement of safety features seen in proactive safety systems to mitigate motorcycle risks and avert them is the focus of patent U.S. Pat. No. 11,189,166 also to Giraud et al. These may include accident prediction systems for a given traffic environment, hazard-vehicle vector trajectories and their wheel directions, and may consider weather conditions, traffic lights, communicate with other vehicles, model upcoming collision scenes by deconstructing previous accidents, or examine rider behavior as a demonstration of their skill. They may detect threat severity, establish priority, and output warnings to create an early anticipation unseen in earlier, purely reactive driver assistance algorithms. Reactive systems may help regain stability via traction control, anti-lock braking, and lane keep assist after a vehicle has experienced some loss of control. In its general application a highly sophisticated, multi-sensor, 360° detection system, using front, back, and helmet cameras, radar, lidar, infrared and humidity sensors, a microphone, and rider weight distribution, feeds data into the overall environment hazard analysis for a best action determination followed by visual, auditory, and seat, handle, and foot peg haptic alerts to transmit a real-time hazard avoidance command to the rider.

This background is not intended, nor should be construed, to constitute prior art against the present invention.

SUMMARY OF INVENTION

Compared to four-wheeled vehicles, motorcycles possess unique functional issues that stem from their ability to lean into a curve. This changes not only the trajectory of the motorcycle, but also the perspective of both rider and onboard sensors or cameras to navigate the road and other obstacles during the turn.

Motorcycle riders themselves may also require a wider view in their mirrors to reach not only into adjacent car lanes but also across the variable gap on either side of the motorcycle in its own lane. This lane gap and thus the rider's view are often spatially unequal on either side of the rider according to the motorcycle's own position to the left, center, or right of the lane. These considerations need to be taken into account in addition to the motorcycle's lane in traffic overall and with respect to the curb. The lane gaps to the left and right of the motorcycle within the lane also change as the motorcycle strategically lines up for curves, surface impediments, or other considerations.

Due to the motorcycle's size and ability to lean, several systems onboard the motorcycle need to know its lateral position on the road, and especially the lateral position within the lane of travel. The present disclosure provides a way for determining the lateral position of a motorcycle within its lane, as well as on the road as a whole. Also, if there are no lane markings present or they are worn or obscured, embodiments of the system are able to compensate for this. The disclosed system uses multiple sensors to determine the placement of the motorcycle on the road, and can determine or predict the trajectory of the motorcycle on the road over its next few seconds of travel.

Disclosed is a method for warning a rider of a motorcycle, the method comprising sensing a lean angle of the motorcycle, calculating lateral extents of an ego lane for the motorcycle using the lean angle, predicting a trajectory of the ego lane using a current motion of the motorcycle, identifying a hazard that is in the ego lane or is expected to be in the ego lane within a future time period measured from a current time, and outputting an alert to the rider.

Also disclosed is a method for calculating an ego lane for a motorcycle, the method comprising sensing a lean angle of the motorcycle and calculating lateral extents of the ego lane for the motorcycle using the lean angle, wherein one of the lateral extents is on a side of the motorcycle in a direction of the lean angle and is of greater magnitude than another of the lateral extents on a side of the motorcycle opposite to the lean angle.

Further disclosed is a motorcycle comprising an alert device, a sensor configured to detect a lean angle of the motorcycle, a processor, a computer readable memory storing computer readable instructions which, when executed by the processor cause the processor to receive the lean angle from the sensor calculate lateral extents of an ego lane for the motorcycle using the lean angle, predict a trajectory of the ego lane using a current motion of the motorcycle, identify a hazard that is in the ego lane or is expected to be in the ego lane within a future time period measured from a current time, and output an alert via the alert device.

BRIEF DESCRIPTION OF DRAWINGS

The following drawings illustrate embodiments of the invention and should not be construed as restricting the scope of the invention in any way.

FIG. 10 is a representation of ego lane boundaries with no lean.

FIG. 11 is a representation of the ego lane boundaries with a 10 degree lean.

FIG. 12 is a representation of the ego lane boundaries with a 20 degree lean.

FIG. 13 is a representation of the ego lane boundaries with a 30 degree lean.

FIG. 14 is a representation of the ego lane boundaries with a 40 degree lean.

DESCRIPTION

A. Glossary

Figure 1:
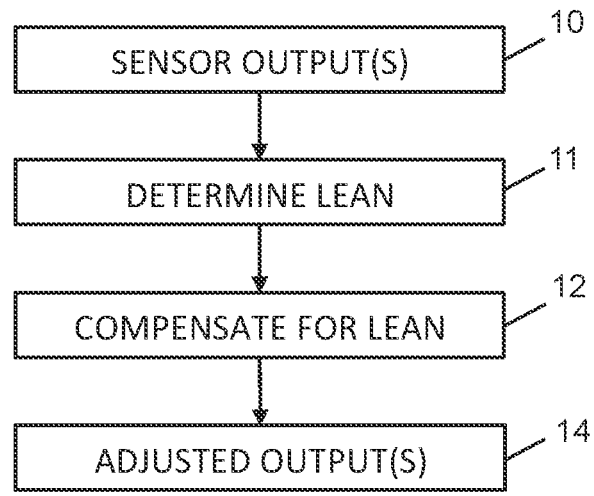
FIG. 1 is a flowchart showing a general method according to an embodiment of the present invention.

AI—Artificial intelligence.

The term "ego lane" with reference to a motorcycle means a path that the motorcycle is traveling in, the path having a width that is typically less than half the width of a lane marked on a road. This is in contrast to the ego lane for a car and other wider vehicles, for which the ego lane is the same as the lane in which the wider vehicle is traveling. In broad terms, a motorcycle rider may divide the current lane of travel into left, center and right portions, each of which may be a different ego lane depending on the lateral position of the motorcycle within the lane of travel. Lateral position within the travel lane is particularly important to motorcycle riders. Furthermore, as the rider moves laterally within the travel lane, the ego lane will also move laterally within the travel lane, correspondingly. The ego lane can be in any position along a lateral continuum across the travel lane, and is not restricted to just the center third, just the left third or just the right third.

The term "firmware" includes, but is not limited to, program code and data used to control and manage the interactions between the various modules of the system disclosed herein for determining the lateral position of a motorcycle on a road and predicting ego lanes, for example, and to provide at least some or all of the functionality of the system. Firmware may be stored in read-only memory in a permanently installed chip, for example.

GNSS—Global navigation satellite system.

GPS—Global positioning system. This is a specific type of GNSS.

The term "hardware" includes, but is not limited to, a computer, processor, sensor and/or the physical housing therefor, as well as a display screen, connectors, wiring, electronic circuitry, interface, mechanical component etc.

IMU—Inertial measurement unit. This is an electronic device including components such as a multi-axis accelerometer and gyroscope that measures a body's specific acceleration and the angular rotation rate of the body.

The term "module" can refer to any component in the disclosed system and to any or all of the features of the invention without limitation. A module may be a software, firmware or hardware module, and may be located in a user device, a motorcycle or a server.

The term "network" can include a mobile network, data network and satellite network without limiting the term's meaning, and includes the use of wireless and/or hard wired connections, and may include connections to and between computers, motorcycles, servers, flash memory data cards and/or memory sticks where appropriate.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "real-time" means that as one action is occurring, another action is occurring in response to it and at the same time, subject to inherent time lags due to electronic and mechanical limitations. The actions may appear to a human to be simultaneous, or to be close enough together that their occurrences are, for substantially all intents and purposes, as good as simultaneous.

The term "software" includes, but is not limited to, program code that performs the computations necessary for interpreting sensor output data and remotely supplied data, determining the lateral position of a motorcycle on a road, predicting a trajectory of the motorcycle and outputting signals to alert the rider of the motorcycle of a hazard or to control a function of the motorcycle.

The term "system", if not otherwise qualified, relates to the subject of the disclosure herein. It relates to a set of components and/or modules that, for example in some embodiments and without limitation, detect environmental data, receive information about the environment, determine a position of a motorcycle on a road, detect parameters of a motorcycle, predict a trajectory of a motorcycle, identify hazards and alert the rider of the motorcycle.

The term "travel lane" or "lane of travel" refers to the usually marked lane on a road within which a vehicle is traveling, whether it be a motorcycle, a car or other vehicle. The lane may be marked on one or both sides with continuous, broken or double lines painted on the road. In some cases, the lane markings are obscured or worn, or there may even be no lane markings present, for example on roads in residential neighborhoods.

B. Exemplary Embodiments

Referring to FIG. 1, the system determines through several sensors the position of the motorcycle on the road, including the lane of travel of the motorcycle and the lateral position of the motorcycle within the travel lane. For example, in step 10, various different sensors provide outputs relating to the environment of the motorcycle. In step 11, the system determines the lean of the motorcycle. In step 12, the system adjusts the outputs of the sensors where necessary to compensate for the motorcycle lean. In step 14, the system outputs the adjusted data from the sensors. For example, if one of the sensors is a camera, then the image obtained while the motorcycle is leaning by an angle $\phi$ is corrected by rotating it by the same angle $\phi$.

Figure 2:
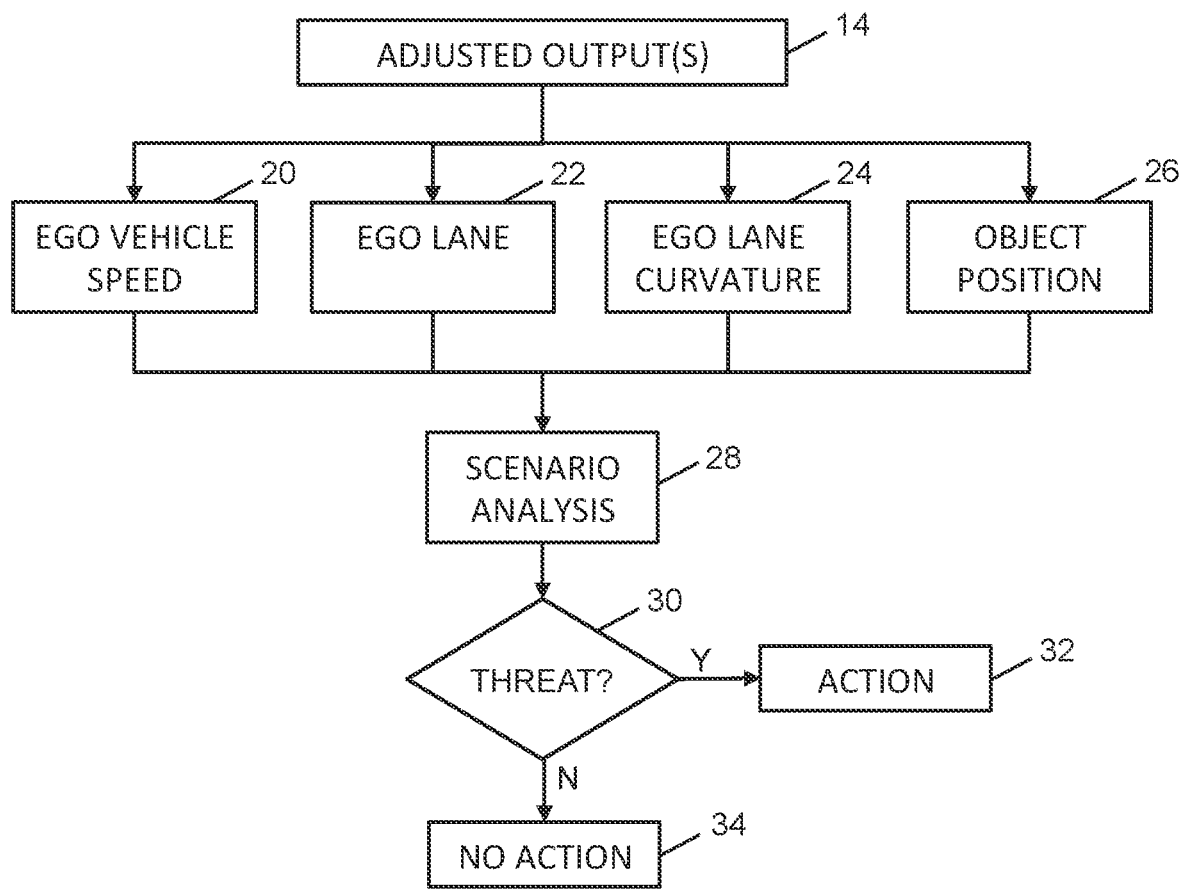
FIG. 2 is a flowchart showing how the system determines the ego lane position, curvature, and trajectory, according to an embodiment of the present invention.

Referring to FIG. 2, further detail is provided as to the steps that occur after the lean of the motorcycle is compensated for in step 12 and the adjusted outputs have been provided in step 14. The adjusted outputs from the sensors may be used to provide a determination of the lateral position and current trajectory of the motorcycle on the road. The adjusted outputs may also be used to continually predict the motorcycle position on the road in its next 2-3 seconds of travel and analyze that point, or any intermediate point, for possible collisions in a threat analysis process.

Once the sensor signals have been adjusted for lean and output in step 14, if the lean is non-zero, the adjusted outputs may be, or may be used to calculate, ego vehicle speed 20 (i.e. motorcycle speed), ego lane 22, ego lane curvature 24, and object position 26. Motorcycle speed as given by a speedometer that is based on the rotation rate of a wheel may need to be compensated for in a lean as the point of contact between the wheel and the road moves around the tire's cross-section to a smaller effective wheel circumference. Objects that are initially detected by the sensors, or are algorithmically determined to be detected by the sensors, together with the positions of the objects, may be reported or not reported after lean compensation, depending respectively on whether they are in (or close to) the predicted ego lane or not. Objects detected may be hazards such as a vehicle other than the motorcycle, a person, a curb, a lane for oncoming traffic, a pothole, debris, a traffic cone, a damaged road surface, a puddle, mud, dirt, ice or an animal. Objects that are reported may be moving objects that are predicted, based on their detected motion, to be at or near the same point in the ego lane as the motorcycle is expected to be any time in its next few seconds of travel.

The outputs from the sensors, after adjustment for lean angle, then undergo scenario analysis in step 28. The output of the scenario analysis may be the identification of one or more scenarios that are known to cause, or potentially cause, an accident or otherwise create a hazard. It is then determined, in step 30, whether any of the identified scenarios represent a threat. Making this determination may depend on one or more thresholds, which may be different for different cohorts of riders depending on their experience and ability level. For example, one setting may be that potential collisions in the next three seconds of travel are identified, which may be a standard setting for the average rider. Another setting may be that potential collisions in only the next two seconds of travel are identified, which may be a setting that is used for the more experienced, able and/or sports-like riders. For example, the settings may switch from one to the other automatically as the motorcycle is switched between a normal mode of operation and a sports mode. In some embodiments of the system, the user has the ability to turn off the hazard notifications that would normally be given as alerts in step 32.

Should there be a foreseen possible or likely point of collision or other hazard, an action is taken in step 32. This may be a warning signal given to the rider, such as a haptic alert, an audible alert, a visible alert on a dashboard of the motorcycle, or a combination of one or more of these. In this case, an action may need to be taken by the rider to avert such a collision or avoid the hazard, and thus the rider receives the signals, suggestions, and/or commands from the system and uses them to determine a safer placement of the motorcycle on the road. In some embodiments, the action taken in step 32 may be the automatic, real-time control of a mechanical parameter of the motorcycle in response to the hazard. Such a parameter may be automatic braking, automatic stiffening of the suspension, dampening of the steering, automatic adjustment of the foot peg position, automatic adjustment of the handlebar height, automatic easing of the throttle, etc. Settings of any or all of these parameters may be controlled automatically in response to the detection of a hazard in the ego lane of the motorcycle.

Should there not be a foreseen possible point of collision or other hazard, the process proceeds to step 34, in which no action is taken. In this case, no action needs to be taken by the rider and the rider will not receive any suggestions or commands, and there will not be any specific automatic control of the features of the motorcycle as a result.

After step 34, or after the threat that led to the action in step 32 has disappeared, then the process reverts to step 10, in a continual cycle of detecting sensor outputs, compensating for motorcycle lean, and identifying hazards. Even if the action in step 32 is not completed, the process may continue in the continual cycle from step 10, because there may be a further hazard that overlaps with the current hazard.

Figure 3:
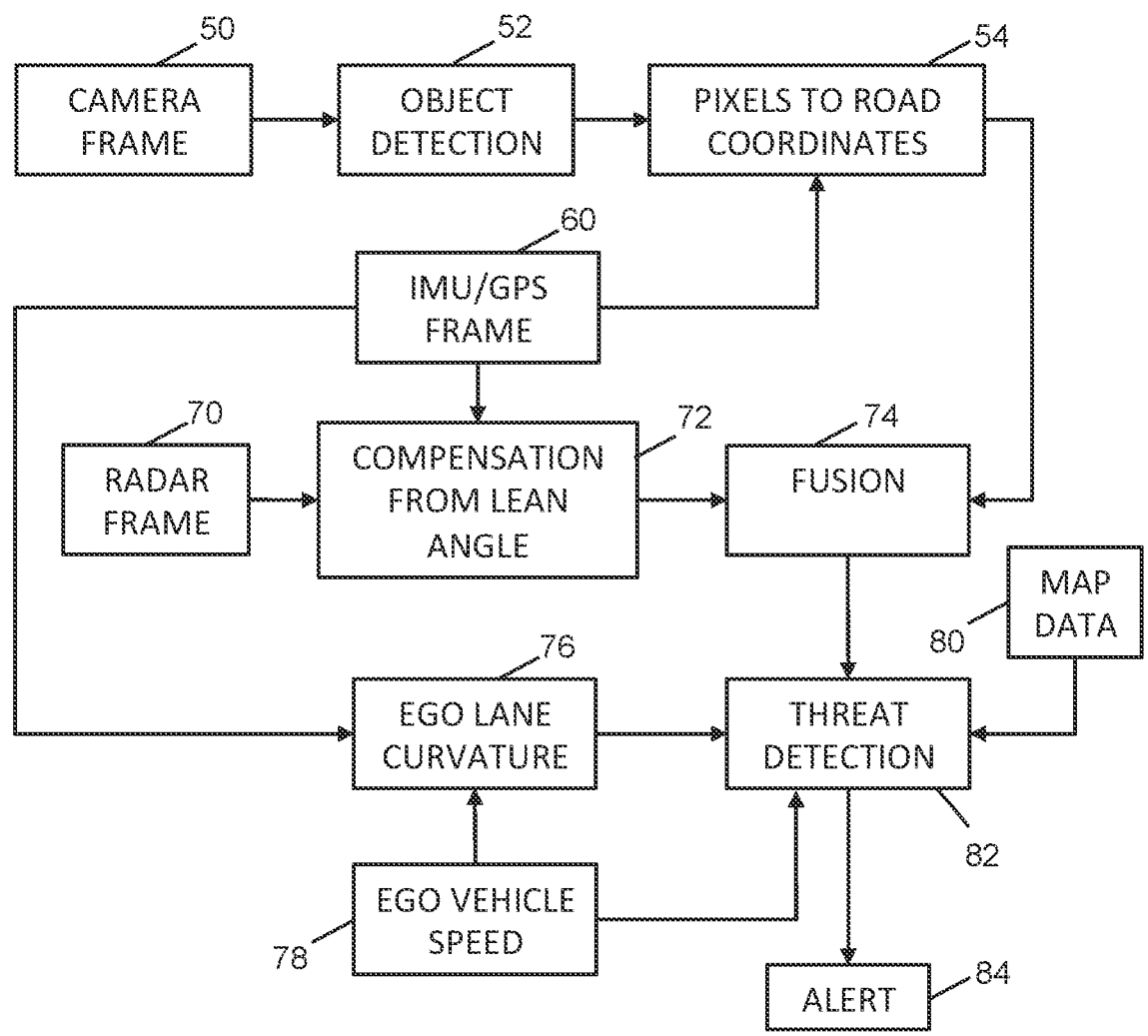
FIG. 3 is a module and flow diagram describing how the system can provide more accurate position and ego lane curvature and trajectory when combined with GPS and map data, according to an embodiment of the present invention.

Referring to FIG. 3, various modules showing a process involving specific sensors is provided. In step 50, camera frames from one or more cameras are captured and analyzed to detect objects in step 52. In module 54, the pixels of the detected objects in the camera frames are converted, using a coordinate transform, to coordinates in the frame of reference in which the motorcycle is traveling, i.e. the coordinate system of the road, or the world coordinate system. Conversion to the road system of coordinates uses yaw, pitch, and roll data, for example, from the IMU/GPS data frames 60 to result in positional data of a detected object that is compensated for the motorcycle's lean angle, in module 72.

Radar frames 70 (which may be high-resolution radar frames) can be used to determine radar-detected object positions and relative speed between the motorcycle and the detected object. Radar detection uses yaw, pitch, and roll data from the IMU/GNSS data frames 60 to result in positional data compensated for lean angle in module 72. In some embodiments, an estimated 0.5 m accuracy of object positioning is achieved, using combined radar and camera detection. Greater or lower accuracy may be obtained depending on the resolution of the sensors that are used. If the radar lean angle is above twenty degrees, due to the motorcycle leaning, then interference from the radar reflecting off the ground may have a significant effect, and should be taken into account. This may be done, for example, by simply ignoring the radar signal above a certain lean angle, gradually de-weighting it as the lean angle increases, or removing the reflection from the signal.

The data for the radar and camera-detected objects is fused by the fusion module 74, which, for example, may include a Kalman filter. Other known algorithms or techniques may be used to fuse the data. The fusion module 74 is typically able to report more optimal object position, and more specifically the object position relative to the motorcycle, and the relative speed of the object to the motorcycle, compared to any one single sensor.

A positional and inertial module provides IMU and GNSS (e.g. GPS) data frames 60. The GNSS module, for example, may determine the rough position of the motorcycle on the roads itself, but added to the IMU and camera data in fusion module 74, the overall positional accuracy of the motorcycle is improved. The IMU data frames 60 from the IMU/GPS module provides the motorcycle's orientation and motion, and is used to determine the ego lane curvature 76. The curvature of the ego lane may be determined using the yaw rate and the speed of the motorcycle. For example, output signals from a gyroscope and accelerometers can be fused to calculate the yaw rate $\bar{\omega}$ in radians. The curvature of the ego lane may then be calculated as $\kappa=\bar{\omega}/v$, where v is the speed of the motorcycle. The path of the motorcycle may then be calculated for a left turn in the coordinate system of FIG. 7, for example by using a quadratic approximation:

$$y=\kappa X^2 \qquad \text{Eq. 1}$$

The left and right boundaries of the ego lane may then be calculated by adding on a variable width to either side of the path, as explained below. The ego lane curvature provides a prediction of the trajectory of the motorcycle over its next few seconds of travel, for example 2-3 seconds. The ego speed 78 (i.e. motorcycle speed) is also used to determine how far along the predicted ego lane the motorcycle will be as a function of time over the following few seconds of its travel.

The ego speed 78, the ego lane curvature 76, the fused location and detected object data from module 74 and map data 80 are fed into the threat detection module 82. The threat determination module 82 identifies whether the motorcycle is in a situation that corresponds to a known traffic scenario, and whether that scenario presents a threat. If the analysis of the data determines that there is a threat to the rider of the motorcycle, then an alert is output via alert module 84.

The map data 80 may include lane boundaries for the road. The map data (which may include satellite imagery of the roads and lanes) combined with the GNSS data, and possibly the IMU data and the camera data may be used to define where the lane boundaries should be, if the map does not provide them or if they are obscured.

The fusion module 74 may also be configured to detect whether the various input sensors are working correctly. If any of the camera, radar, IMU, GNSS, speedometer are not providing data, or providing erratic, inaccurate or inconsistent data, then the data from the particular sensor that is failing is disregarded by the fusion module 74. Known techniques may be used to determine sensor inaccuracy. In some embodiments, duplicate sensors are incorporated in the motorcycle for further redundancy.

Figure 4:
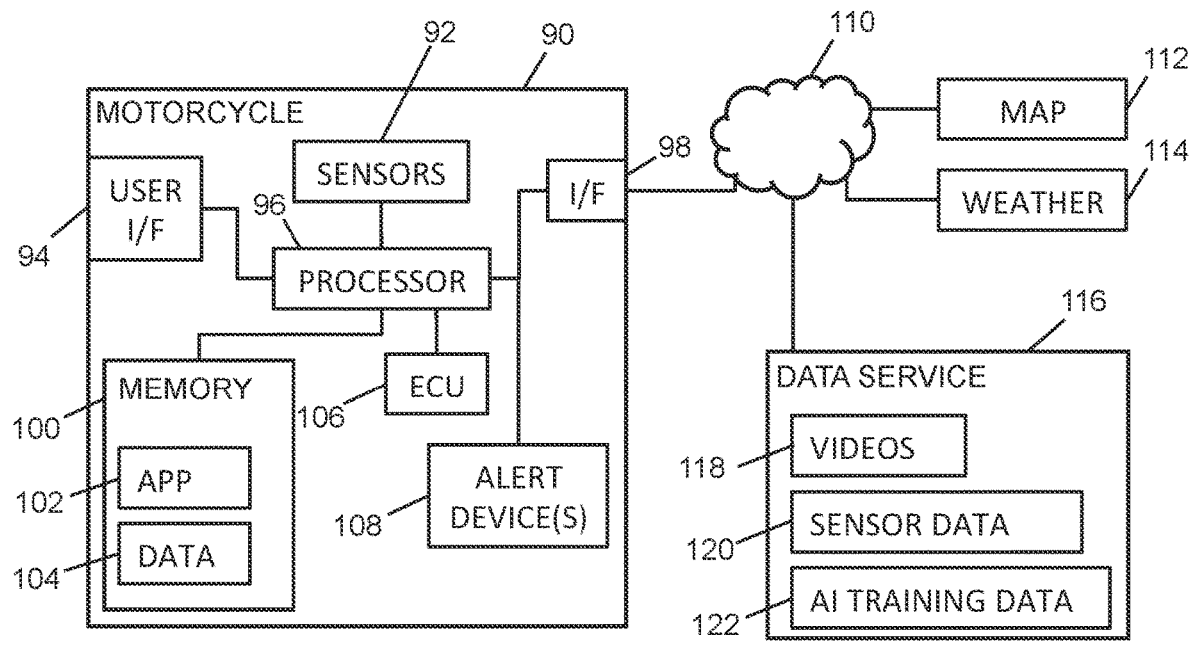
FIG. 4 is a block diagram describing the system, including connection to a data collection server, according to an embodiment of the present invention.

Referring to FIG. 4, interconnections between various components of the system are shown. The system for the motorcycle 90 is operated by an application 102 in the memory 100, which also stores data 104 that is used or generated by the application. The application is executed by the processor 96. The processor 96 receives input from or provides output to sensors 92, user interface 94, and the interface 98 linked to the cloud via network 110. The processor 96 is also operatively connected to the motorcycle's ECU 106 and alert devices 108. The alert devices may be installed in the motorcycle or they may be personal communication or other devices such as a docked smart phone in the motorcycle or wireless earphones. Map data 112, which may be stored in a remote server, is fed into the motorcycle 90 via interface 98, and some or all of the local map data may be stored in the memory 100 as part of the data 104. Weather data 114, which may be stored in a remote server, is fed into the motorcycle 90 via interface 98, and some or all of the local weather data may be stored in the memory 100 as part of the data 104. One or more of the sensors on the motorcycle may also provide temperature information, for example.

Depending on the weather information and how it changes during the ride, the system may adjust the thresholds for threat determination during the ride. For example, the atmospheric pressure, temperature and precipitation levels may influence the traction of the road wheels, which in turn may require the thresholds to be lowered or raised accordingly. In other embodiments, the thresholds may be altered depending on how busy the traffic is. For example, in busier traffic, the thresholds for triggering an alert to the rider may be lower than when the traffic is lighter. The system itself may detect the amount of traffic, or it may be fed to the motorcycle from a remote server.

Videos 118 and sensor data 120 identifying the true situation on the ground at the location of the motorcycle can also be uploaded to the cloud via network 110 and collected on the remote server 116. AI training data 122 based on real-time information provided by the motorcycle and other motorcycles connected to the system may also be provided to and stored on the remote server 116. The AI models for object detection and threat determination can be analyzed and trained via machine learning to improve object detection and threat determination, using the AI training data 122. For example, ongoing development of the threat detection module 82 (FIG. 3) may result in different thresholds for similar traffic scenarios at different locations on the map.

Figure 5:
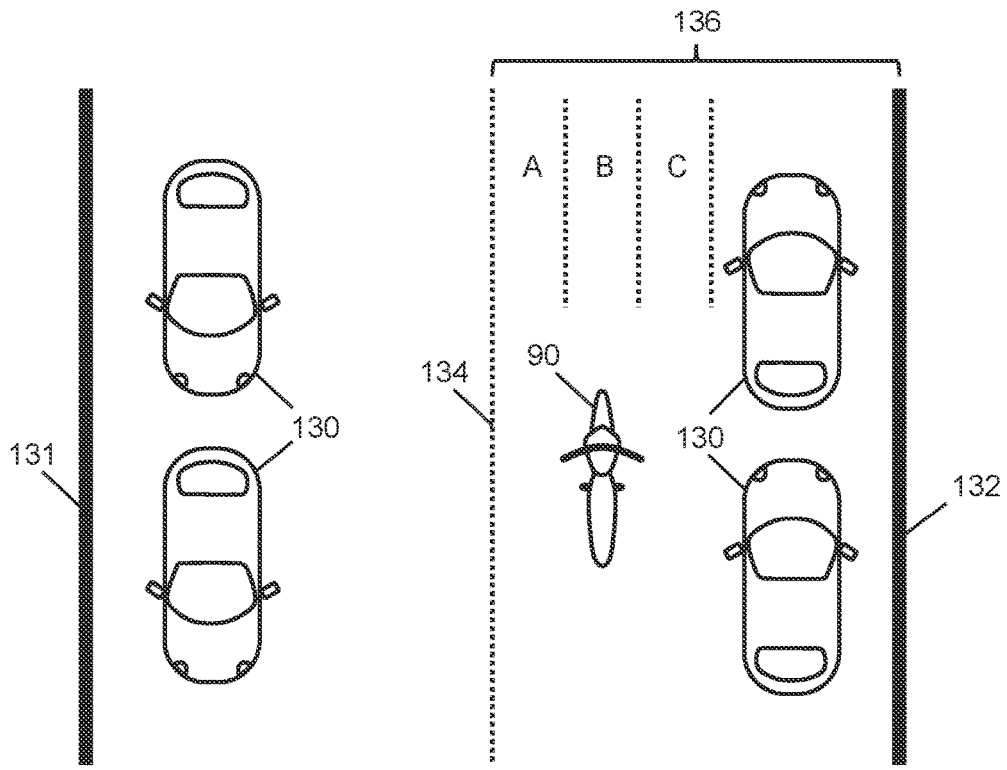
FIG. 5 is a schematic diagram showing the system defining lanes when there are no line markings on the road, according to an embodiment of the present invention.

Referring to FIG. 5, the system compensates for missing lane marks when there are no lines on the road. GNSS data 60 from the IMU/GPS module and map related information 80 define the boundaries of the road such as the curbs 131, 132. The system deduces the missing center line 134 separating opposing traffic from the lane 136 that the motorcycle is traveling in. The system can deduce this because it is known that the road is a two-way road in, for example, a residential area. Map and/or satellite imagery may inform the width of the road, which may also be taken into account to determine whether there should be one or two travel lanes in a particular travel direction. The camera system recognizes parked cars 130 and may define potential motorcycle ego lanes A, B and C. This may be done, for example, by dividing the deduced travel lane into three equal portions. In some cases, the ego lanes may be wider, and overlap each other. In this example, the ego lane of the motorcycle 90 is lane B, which is the middle third of the available lateral width for the motorcycle. As it can be seen, the system is able to determine the ego lane of the motorcycle to an accuracy of a fraction of a travel lane width.

Figure 6:
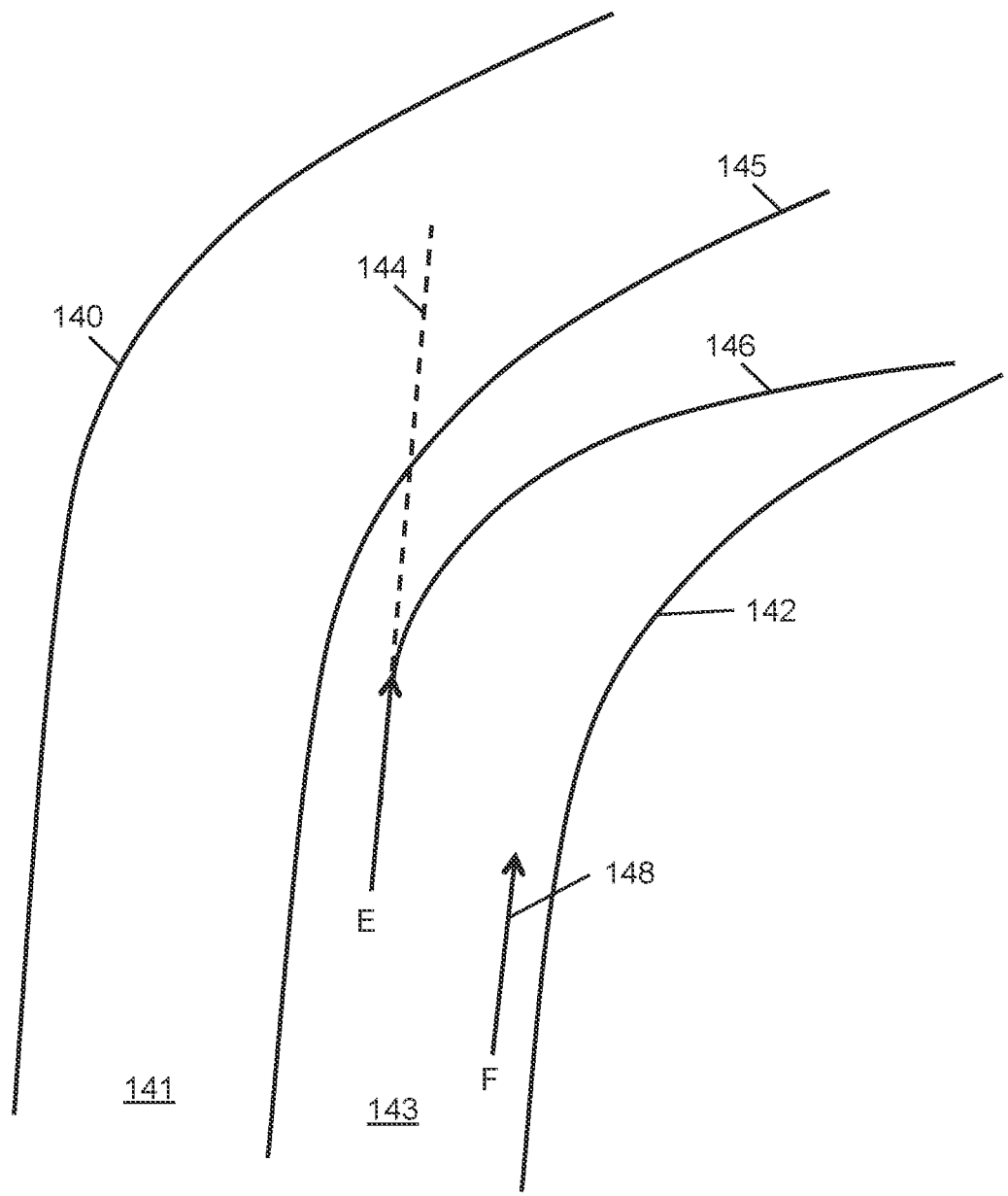
FIG. 6 is a schematic diagram showing motorcycle trajectories in a curve.

Referring to FIG. 6, a curved road with lanes 141, 143 is shown with boundaries being the rider side curb 142 and the opposing traffic curb 140. A motorcycle traveling through position E, for example, has a straight trajectory 144 vastly different from the lane's curve. The system calculates, based on the IMU yaw angle and the current motorcycle speed that the rider will cross the center line 145 into opposing traffic in, perhaps its next 2-3 seconds of travel, depending on the speed of the motorcycle. The system analyzes the threat and alerts the rider, prompting a change in the rider's lean and direction which will result in the motorcycle adjusting to the safer trajectory 146 to remain within the rider's own travel lane 143 around the curve. The system issues an emergency command which, if heeded, should keep the motorcycle clear of a more dangerous and often fatal head on traffic collision.

The same process may still be applied if the motorcycle starts to lean or turn after passing point E. The system calculates, based on the IMU yaw angle and the current motorcycle speed whether the rider will cross the center line 145 into opposing traffic in the following 2-3 seconds of its travel, or other time period, depending on the speed of the motorcycle. The system analyzes the threat and continues to alert the rider if necessary, prompting an increase in the rider's lean which will result in the motorcycle adjusting to a safer trajectory to remain within the rider's own travel lane 143 around the curve. The same process may also be applied if the motorcycle is already turning at point E.

The system would not need to be as quick to alert in the case of the motorcycle in traveling in a straight line 148 through position F, further back from the curve and further away from the center line 145 of the road. In this case, the rider is able to turn without an imminent conflict with opposing traffic as the consideration of ego lane position (e.g. centered on E or F) within the lane 143 sets different threat thresholds for the motorcycle trajectory versus lane curvature.

Figure 7:
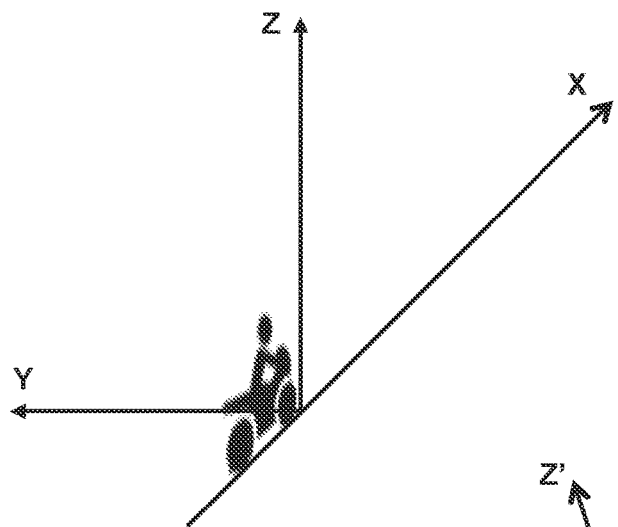
FIG. 7 is a schematic diagram displaying a world coordinate system in which a motorcycle is traveling.

FIG. 7 shows the motorcycle traveling in a 3D XYZ coordinate system where the operational riding surface lies in the X, Y plane and Z refers to height above ground. This coordinate system may be referred to as the world coordinate system or the road coordinate system. The rider is riding in the positive X direction into the page. The Y direction is lateral to the rider, who is riding along the line Y=0 in the X-Y plane. As long as the motorcycle is traveling along this line without leaning, the coordinate system of the motorcycle can be considered to be the same as the world coordinate system, or it may be considered to translate along the X axis without rotation.

Figure 8:
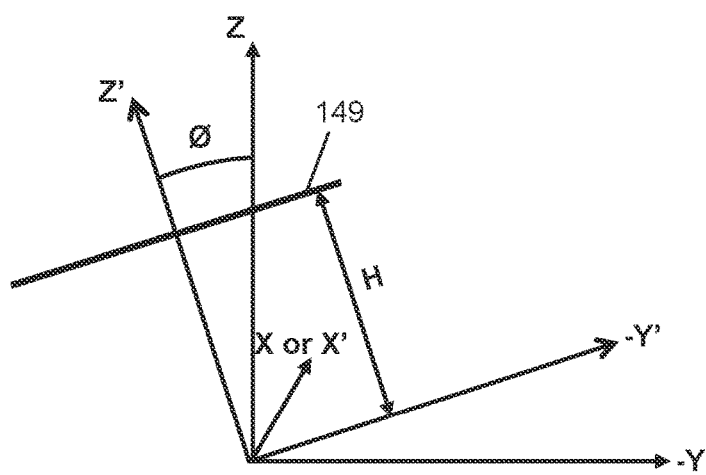
FIG. 8 is a schematic diagram displaying motorcycle and world coordinate systems when the motorcycle is in a lean.

FIG. 8 shows that when the motorcycle leans by an angle φ, the lean transforms the motorcycle frame of reference into the X'Y'Z' coordinate system. The direction of travel remains the same, at least momentarily, as X=X". During the lean the rider height in the world coordinate system XYZ is reduced to a fraction cos(φ) of what it was when the rider was not leaning. The radar-sensing plane 149 at height H likewise tilts along with the leaning rider and motorcycle by an angle φ. Note that the left portion of the radar-sensing plane 149 becomes closer to the ground (X-Y plane) whereas the right portion of the radar-sensing plane rises.

Figure 9:
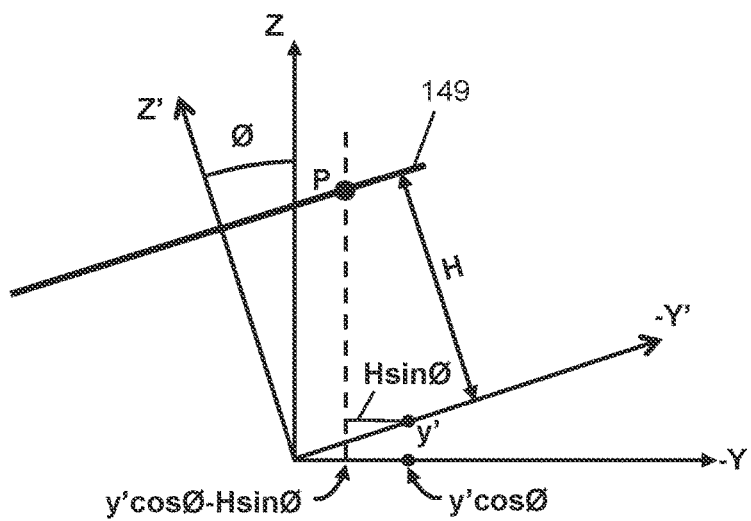
FIG. 9 is a schematic diagram showing how the motorcycle lean changes the measurement for a stationary object.

Referring to FIG. 9, as a result of the rider lean and likewise rolling radar into the X'Y'Z' coordinate system and frame of reference, stationary objects in the XYZ coordinate system will result in a different measurement. Just as to a stationary observer standing on the ground the height of the leaning rider becomes shorter as some of the height is displaced laterally along the Y axis, the center point of the motorcycle-mounted radar is also lower. Also, because it is mounted above ground level, it becomes offset to the side. From the leaning motorcycle and in the radar X'Y'Z' frame of reference, stationary objects may appear taller or shorter than actual, depending on whether the radar plane 149 is tilted down or up respectively, and the observed height may also depend on how far the object is displaced laterally from the X axis. Also, the real world value y for the lateral position of an object will be different to the lateral position y' as detected by the radar in the motorcycle's X'Y'Z' frame of reference. For a motorcycle riding on the ground the affected height of an object is normally unimportant, but the distorted lateral positioning on the road requires compensation for the radar to be a reliable sensor for rider safety. Using a coordinate system transform, the real world lateral position y of a radar-detected object P can be determined from the lateral position y' of the object measured in the motorcycle frame of reference using the equation y=y' cos(φ)–H sin(φ), where H is the height of the radar detector above ground level when the motorcycle is not leaning, and φ is the angle of lean.

FIGS. 10-14 are illustrations of the ego lane widths of a motorcycle for different lean angles. The ego lane 160 of the motorcycle may be specified as having a width made up of a left portion 150 and a right portion 152. In FIG. 10 it is shown that when the lean angle is zero, the left and right sides 150, 152 respectively of the ego lane are equal in size and the ego lane is centered where the motorcycle 154 makes contact with the road. Bearing in mind that the positive direction of the Y axis is to the left, the extent of the left and right sides of the ego lane at zero lean angle may be represented respectively as (W, –W), where W is the ego lane half-width at zero lean angle. As a non-limiting example, W may be 0.75 m. More generally, the extent of the left side ego lane width is $W_L$ and the extent of the right side ego lane width is $W_R$.

FIGS. 11-14 show how the left and right sides 150, 152 respectively of the ego lane change with 10-40° of lean with regard to the vertical 156. As the lean angle increases, the ego lane boundary of the motorcycle generally increases to the side of the lean and decreases on the opposite side of the lean. When predicting trajectories, the ego lane curve positions will change significantly when the motorcycle leans, and may be significantly different than if they were calculated without taking into account the lean of the motorcycle. The extents of the left side ego lane width $W_L$ and the right side ego lane width $W_R$ may be calculated using the following equation, where $H_M$ is the height of the maximum width of the motorcycle when the motorcycle is not leaning and L is the height of the rider and motorcycle combined (i.e. when the rider is riding the motorcycle) when they are not leaning:

$$W_L = \max(W\cos(\phi) - H_M \sin(\phi), -L\sin(\phi), 0) \qquad \text{Eq. 2}$$

$$W_R = \min(-W\cos(\phi) - H_M \sin(\phi), -L\sin(\phi), 0) \qquad \text{Eq. 3}$$

Other equations may be used in other embodiments to express how the ego lane width of the motorcycle changes or moves laterally as the motorcycle leans.

Increased lean also results in an increased blind spot to the outside of the curve, and a decreasing to null blind spot to the inside of the curve. Blind spot sensors may be adjusted automatically, accordingly according to the curvature of the ego lane, to detect a wider field to the outside of the curve and a narrower field to the inside of the curve. Furthermore, by predicting the motorcycle's likely future position over the next few seconds of travel, the predicted position can be combined with data from a dynamic blind spot monitoring system to model a possible future collision and alert the rider.

The system, using a computer vision engine and fusion with map data and IMU/GNSS data, and appropriate models, may also determine the optimum travel lane that the motorcycle should be riding in as well as the lateral position within the lane. For example, the camera system may detect that there is a pot-hole ahead, in the predicted ego lane of the motorcycle. As a result, the system may then alert the driver. Furthermore, the system may alert the driver to steer to a specific side of the pot-hole, or to switch into an adjacent travel lane. As such, the system may in some embodiments be able to inform the rider as to which lane is the optimum lane for traveling in.

Figure 15:
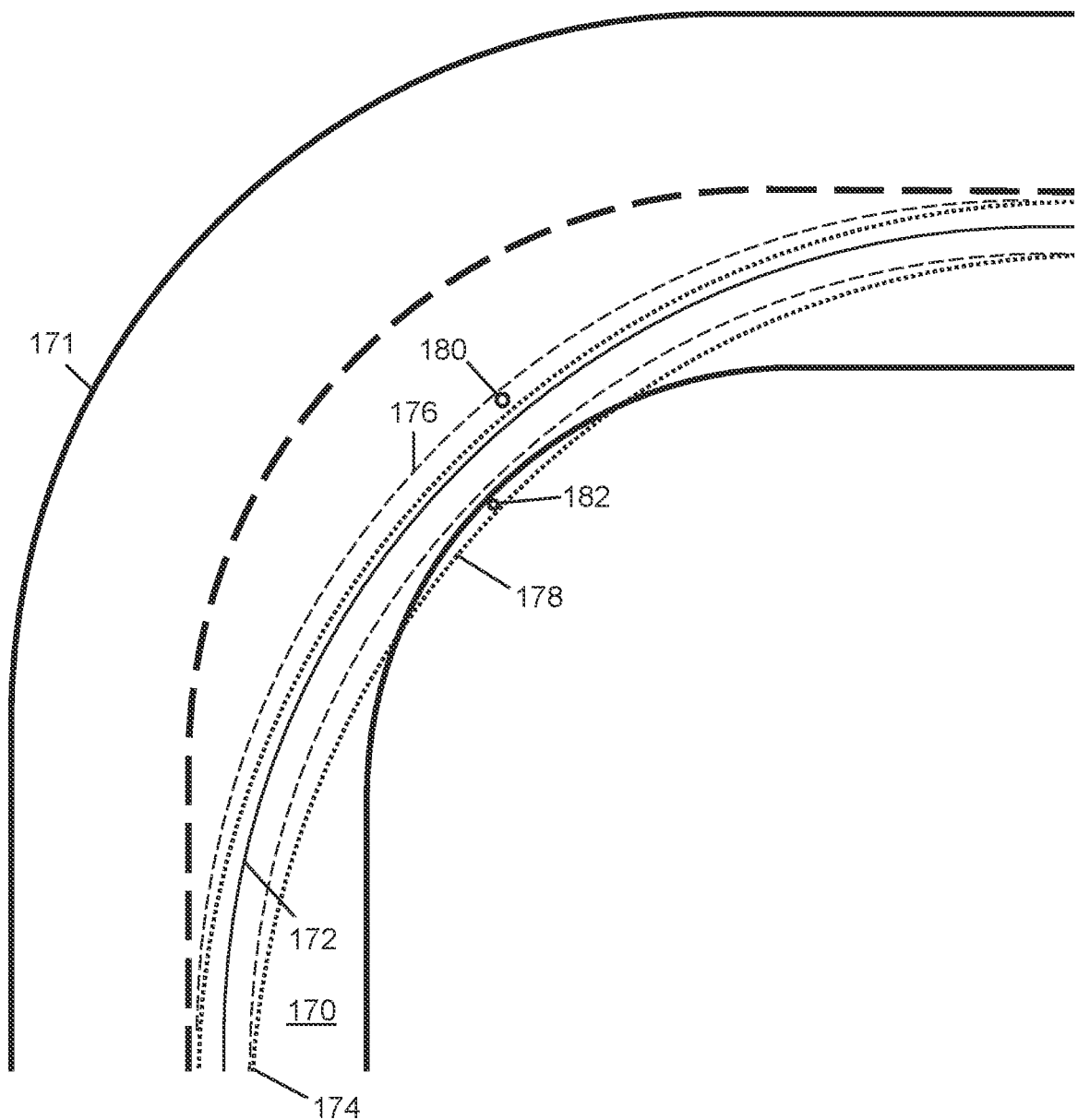
FIG. 15 shows compensated and uncompensated ego lanes for a curve, according to an embodiment of the present invention.

Referring to FIG. 15, a motorcycle is traveling in a travel lane 170 of a road 171. The motorcycle travels in the travel lane 170 along the path 172, which represents the point of contact of the motorcycle's wheels with the road 171. The portion of the ego lane 174 before the motorbike enters the turn is shown to have equal widths to each side of the motorcycle path 172. Ego lane 176 is the portion of the ego lane that would be calculated for the motorcycle if the lean of the motorcycle were not taken into account in the corner. As such, ego lane 176 can be seen to continue to have equal widths to the left and right of the path 172 as it curves. Ego lane 178 is the portion of the ego lane that is calculated for the motorcycle when the lean of the motorcycle is taken into account in the corner. As such, ego lane 178 can be seen to have unequal widths to the left and right of the path 172. The left side of the ego lane 178, to the left of the path 172 in the corner, is narrower than the right side of the ego lane in the corner.

A consequence of not compensating for the motorcycle lean when determining the ego lane is that obstacle 180, which may be for example a pothole, is identified as a potential hazard. When the ego lane 178 is lean-compensated, then obstacle 180 is determined not to be a hazard because it is outside the ego lane. Another consequence of not compensating for the motorcycle lean when determining the ego lane is that obstacle 182, which may be a person on a sidewalk, is not recognized as a potential hazard. When the ego lane 178 is lean-compensated, then obstacle 182 is determined to be a hazard because it is in the ego lane.

C. Variations

In general, unless otherwise indicated, singular elements may be in the plural and vice versa with no loss of generality. Numerical quantities, when given to the nearest whole number, include all values to within ±0.5 of that number. Other numbers are given to the nearest significant figure.

Different half-widths of the ego lane for the non-leaning orientation of the motorcycle may be used other than that suggested above. The half-width may depend on the width of the motorcycle. Ego lane compensation for lean may be different for different types of rider. For example, inexperienced riders may be given a wider ego lane than experienced riders. The change in ego lane width and placement relative to the contact point of the motorcycle with the road may be different for experienced riders compared to inexperienced ones. For example, an inexperienced rider may lean less into a curve than the motorcycle does, and an advanced rider may lean more into the curve than the motorcycle. Pressure sensors in the motorcycle seat may detect the lateral positioning of the rider on the seat and indicate the extent to which the rider is leaning relative to the motorcycle.

In some embodiments, the actual width of the ego lane is fixed, and it moves to the left and right of the motorcycle's contact point with the road as the motorcycle leans to the left and right respectively.

In some embodiments, the ego lane trajectory is predicted based on a rate of change of the lean angle as well as taking into account the current lean of the motorcycle. In some embodiments, the ego lane is predicted based on past riding patterns of the rider. In some embodiments, the prediction of the ego lane is based on riding patterns of other riders, or the physical dimensions and layout of the road. Different algorithms may be used to determine the position of the motorcycle within the travel lane.

In some embodiments, other sensors may be used to detect objects, such as a lidar sensor.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the lines between hardware, firmware and software are not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main function of the invention. Steps shown to occur in parallel may be changed to occur sequentially and vice versa. Flowcharts from different figures may be combined in different ways. Modules may be divided into constituent modules or combined into larger modules. All parameters, dimensions, proportions, and configurations described herein are examples only and actual values of such depend on the specific embodiment. Accordingly, the scope of the invention is to be construed in accordance with the substance defined by the following claims.

The invention claimed is:

1. A method for warning a rider of a motorcycle, the method comprising:
   sensing a lean angle of the motorcycle;
   calculating lateral extents of an ego lane for the motorcycle using:

the lean angle;
a height at which the motorcycle has a maximum width when the motorcycle is not leaning; and
a combined height of the motorcycle and the rider when the motorcycle is not leaning;
predicting a trajectory of the ego lane using a current motion of the motorcycle;
identifying a hazard that is in the ego lane or is expected to be in the ego lane within a future time period measured from a current time; and
outputting an alert to the rider.

2. The method of claim 1, wherein one of the lateral extents is on a side of the motorcycle in a direction of the lean angle and is of greater magnitude than another of the lateral extents on a side of the motorcycle opposite to the lean angle.

3. The method of claim 1, comprising determining the current motion using:
a speedometer; and
multiple accelerometers or an inertial measurement unit.

4. The method of claim 1, comprising:
sensing a speed of the motorcycle;
sensing a rate of change of yaw of the motorcycle; and
using the speed and the rate of change of yaw to determine the current motion.

5. The method of claim 1, wherein the future time period is between 2 and 3 seconds.

6. The method of claim 1, comprising receiving an input from the rider that changes the future time period.

7. The method of claim 1, wherein the future time period depends on a location of the motorcycle on a map.

8. The method of claim 1, comprising determining one or both of:
a lateral position of the motorcycle on a road;
a lane in which the motorcycle is traveling;
using GNSS (global navigation satellite system) data and map data.

9. The method of claim 1, comprising adjusting a mechanical parameter of the motorcycle in response to detecting the hazard, wherein the mechanical parameter is a brake setting, a throttle setting, a suspension setting, a steering setting, a handlebar setting or a foot peg setting.

10. The method of claim 1, comprising adjusting a blind spot detector of the motorcycle in response to calculating the lateral extents of the ego lane.

11. The method of claim 1, comprising using a lean angle of the rider to calculate the lateral extents of the ego lane for the motorcycle.

12. A motorcycle comprising:
an alert device;
a sensor configured to detect a lean angle of the motorcycle;
a processor;
a computer readable memory storing computer readable instructions which, when executed by the processor cause the processor to:
receive the lean angle from the sensor;
calculate lateral extents of an ego lane for the motorcycle using:
the lean angle;
a height at which the motorcycle has a maximum width when the motorcycle is not leaning; and
a combined height of the motorcycle and a rider of the motorcycle when the motorcycle is not leaning;
predict a trajectory of the ego lane using a current motion of the motorcycle;
identify a hazard that is in the ego lane or is expected to be in the ego lane within a future time period measured from a current time; and
output an alert via the alert device.

13. The motorcycle of claim 12, wherein one of the lateral extents is on a side of the motorcycle in a direction of the lean angle and is of greater magnitude than another of the lateral extents on a side of the motorcycle opposite to the lean angle.

14. The motorcycle of claim 12, comprising:
a speedometer; and
multiple accelerometers or an inertial measurement unit;
wherein the computer readable instructions cause the processor to determine the current motion using the speedometer and the multiple accelerometers or the inertial measurement unit.

15. The motorcycle of claim 12, wherein the computer readable instructions cause the processor to use a speed of the motorcycle and a rate of change of yaw of the motorcycle to determine the current motion.

16. The motorcycle of claim 12, wherein the computer readable instructions cause the processor to receive an input from the rider that changes the future time period.

17. The motorcycle of claim 12, wherein the computer readable instructions cause the processor to adjust a mechanical parameter of the motorcycle in response to detecting the hazard.

18. The motorcycle of claim 17, wherein the mechanical parameter is a brake setting, a throttle setting, a suspension setting, a steering setting, a handlebar setting or a foot peg setting.

* * * * *